UNITED STATES PATENT OFFICE.

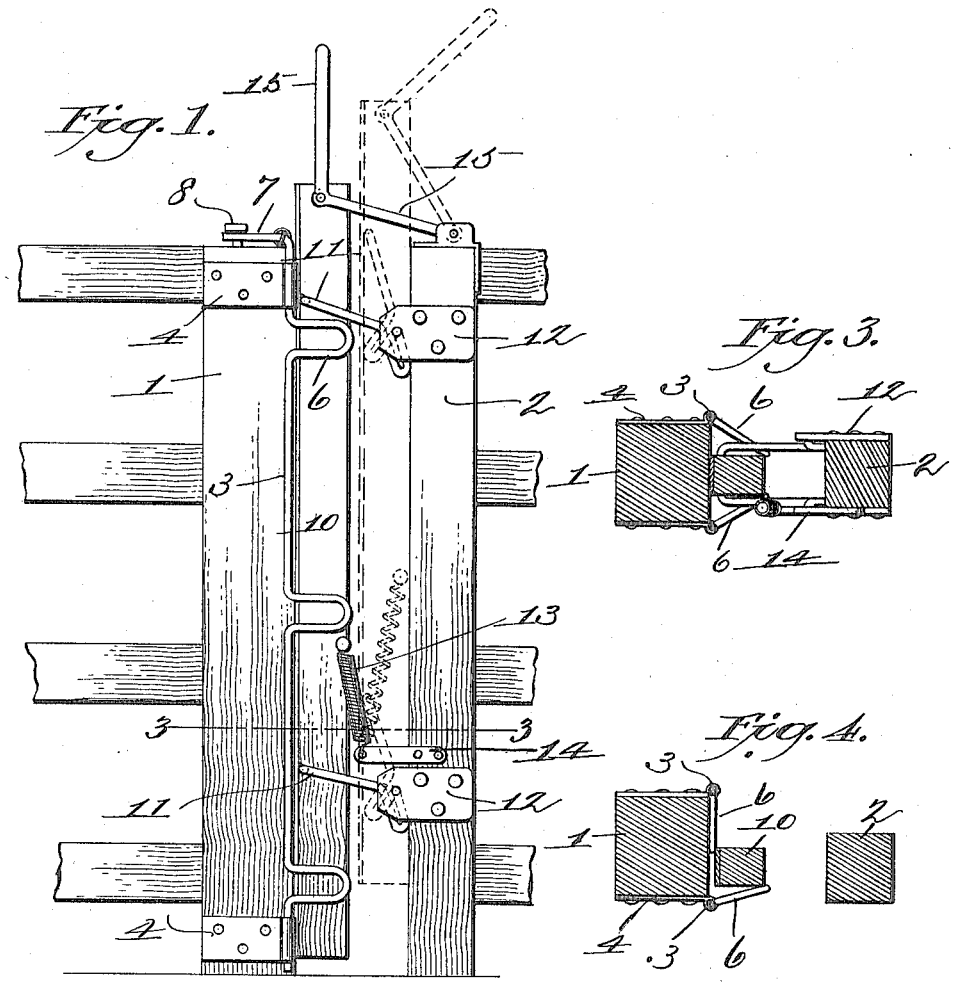

HENRY KUHNHENN, OF AVOCA, NEBRASKA.

GATE-LATCH.

1,164,365. Specification of Letters Patent. Patented Dec. 14, 1915.

Application filed March 12, 1915. Serial No. 13,943.

*To all whom it may concern:*

Be it known that I, HENRY KUHNHENN, a citizen of the United States, residing at Avoca, in the county of Cass and the State of Nebraska, have invented a new and useful Improvement in Gate-Latches, of which the following is a specification.

This invention relates to a latch and keeper therefor operable from either side of the gate, and while it may be directly operated, it is especially designed for use in connection with gates intended to be opened or closed from a vehicle, said gates being operated by a system of cords or cables and pulleys. In connection with the operation of such gates it is essential that some means be provided whereby the gate may be unfastened before the swinging movement can commence.

The invention consists in two vertically arranged and hinged keepers held in normal position by means of a spring, and of a re-tractable bar carried by the gate and forming a part thereof, said bar normally resting between said keepers, and riding over one of them when the gate moves from open to closed position, the bar moving in pivotal points from between the keepers to release the gate.

In the accompanying drawings: Figure 1 is a side elevation, the bar forming the latch being shown in locking position in full lines and in releasing position in dotted lines. Fig. 2 is a top plan view. Fig. 3 is a section on the line 3—3 of Fig. 1. Fig. 4 is a detail sectional view illustrating the position of the parts as the gate moves into closed position.

In the drawings 1 represents one of the gate posts and 2 an end portion of the gate.

Keepers 3 are mounted vertically on the post 1 extending from top to bottom. Preferably these keepers are formed of rods journaled in sleeve portions of plates 4 secured to opposite faces of the post, and each rod is bent to form a number of laterally and horizontally projecting loops 6. The upper ends of the rods are angled as at 7 to extend over the post and engage stops 8 which limit the turning movement of the rods in one direction. The portions 7 are connected by a spring 9 which normally holds the keepers in proper position, and also returns them to normal position.

The gate carries a vertically arranged latch-bar 10 carried by pivoted loops 11 secured to plates 12 carried by the gate. A coil spring 13 connected at one end to the bar 10 and at the other end to a plate 14, carried by the gate, holds and returns the latch bar in and to normal position.

An angled bail 15 is pivotally carried by the top corner of the gate and is also pivotally connected to the upper end portion of the latch-bar.

In operation the gate is released by a pull on the bail 15, as, where the gate is operated from a vehicle, through the medium of a cable, (not shown) though the bail may, if desired, be directly operated by hand. The swinging of this bail lifts the latch bar and at the same time retracts it from between the keepers, the bar moving into the position shown in dotted lines. The gate is intended to swing in either direction. When the gate closes the bar 10 strikes one of the keepers and swings it inwardly against the post, as shown in Fig. 4. When the bar has cleared this keeper the spring 9 returns the keepers to the position shown in Fig. 2.

What I claim is:

The combination with a gate and its post, of rotatable keepers mounted vertically on the post, spring means connecting said keepers, a vertically arranged latch-bar pivotally hung on said gate, and movable upwardly and outwardly with respect to the keepers, a spring for holding the latch bar in normal position, and a bail pivotally mounted on the gate and connected to the latch-bar, as and for the purpose set forth.

HENRY KUHNHENN.

Witnesses:
Jos. C. ZIMMERER,
C. W. FAHNESTOCK.

Copies of this patent may be obtained for five cents each, by addressing the "Commissioner of Patents, Washington, D. C."